(12) United States Patent
Wehner et al.

(10) Patent No.: US 7,904,524 B2
(45) Date of Patent: Mar. 8, 2011

(54) CLIENT RECOMMENDATION MECHANISM

(75) Inventors: Kristopher C. Wehner, Oakland, CA (US); Olivia Simantob Teich, Palo Alto, CA (US); Paul Martino, Mountain View, CA (US)

(73) Assignee: Aggregate Knowledge, San Mateo, CA (US)

( * ) Notice: Subject to any disclaimer, the term of this patent is extended or adjusted under 35 U.S.C. 154(b) by 313 days.

(21) Appl. No.: 12/215,960

(22) Filed: Jun. 30, 2008

(65) Prior Publication Data

US 2009/0013053 A1    Jan. 8, 2009

Related U.S. Application Data

(63) Continuation-in-part of application No. 11/369,562, filed on Mar. 6, 2006, now Pat. No. 7,788,358.

(51) Int. Cl.
*G06F 15/16* (2006.01)

(52) U.S. Cl. .......... 709/206; 709/203; 709/219; 709/224

(58) Field of Classification Search .................. 709/203, 709/206, 219, 224; 705/14; 707/609
See application file for complete search history.

(56) References Cited

U.S. PATENT DOCUMENTS

| | | | |
|---|---|---|---|
| 6,014,502 A * | 1/2000 | Moraes | 709/219 |
| 6,088,510 A | 7/2000 | Sims | |
| 6,438,579 B1 | 8/2002 | Hosken | |
| 7,155,508 B2 * | 12/2006 | Sankuratripati et al. | 709/224 |
| 7,370,004 B1 | 5/2008 | Patel et al. | |
| 7,599,852 B2 * | 10/2009 | Bosarge et al. | 709/203 |
| 7,693,827 B2 | 4/2010 | Zamir et al. | |
| 7,752,074 B2 * | 7/2010 | Bosarge et al. | 709/203 |
| 2001/0021914 A1 | 9/2001 | Jacobi et al. | |
| 2002/0010747 A1 * | 1/2002 | Jaehyuk-Hwang | 709/224 |
| 2003/0182189 A1 * | 9/2003 | Yoshida et al. | 705/14 |
| 2003/0191689 A1 * | 10/2003 | Bosarge et al. | 705/14 |
| 2004/0122910 A1 | 6/2004 | Douglass et al. | |
| 2007/0053513 A1 | 3/2007 | Hoffberg | |
| 2008/0208691 A1 * | 8/2008 | Umezawa | 705/14 |
| 2009/0013053 A1 * | 1/2009 | Wehner et al. | 709/206 |
| 2009/0089259 A1 | 4/2009 | Musumeci et al. | |

\* cited by examiner

*Primary Examiner* — Ramy M Osman
(74) *Attorney, Agent, or Firm* — Blakely, Sokoloff, Taylor & Zafman LLP

(57) ABSTRACT

When an end user opens an e-mail the user's e-mail client requests the image content based on the image tag from a recommendation platform and sends an identification to the recommendation platform as part of the image URL. The user ID or seed item is looked up in the recommendation platform database and associated behavioral data and any applicable rules to generate content for the e-mail and the content is then displayed in the e-mail as an image. When the image is engaged, a request is sent to the recommendation platform that references the user or request identifier and a logical location in the image where the click occurred, the image location is looked up along with the user or request identifier to present the correct page or content for the user.

20 Claims, 4 Drawing Sheets

CLIENT RECOMMENDATION MECHANISM

This application is a continuation in part application from application Ser. No. 11/369,562 filed Mar. 6, 2006, now U.S. Pat. No. 7,788,358 and claims priority thereof.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention pertains to the dynamic generation of content for electronic mail (e-mail).

BACKGROUND

One of the greatest challenges that Internet advertisers and publishers currently face is providing relevant content to their consumers across their touch points. The concept of "ad blindness" (e.g., a tendency for users to ignore anything that is separate from main content of a website) is a problem that dramatically reduces the value of an advertisement. Thus, advertising effectiveness can be improved by understanding the likes and dislikes of consumers.

One way to determine a customer's preferences is to collect information directly from the customer. Although effective, some of the problems with using specific information is that the data needs to be voluntarily provided, isn't always accurate, is typically tied to personally identifiable information, is based on the preferences of that particular day and is difficult to update.

Another mechanism for determining user preferences is to track the behavioral data of users as they view web pages, and purchase products in the internet. This implicit data collection can be accomplished anonymously or tied to a specific known identification. This sort of behavioral preference information can also be aggregated in relation to content items to benefit first-time visitors with the knowledge and experience of people who have come before them about what is most relevant.

Complimentary to recommendations and advertising directly on web pages is the e-mail marketing channel, which offers another touch-point with potential customers and loyal users. By understanding what is happening on a website (e.g., new content, changing meta-data and status, etc.) and each consumer's likes, either explicitly or implicitly, e-mail campaigns can be more effective.

Therefore what has been needed and heretofore unavailable is a system and method for determining in real time fresh information that fits user preferences and the current state of available offerings to enable e-mail marketing campaigns that are more relevant and interesting to engage and retain recipients.

SUMMARY

According to one embodiment, an identifier is created for a user having a web browser to communicate with a web server that serves web pages. User behavior data is collected based upon the browsing history of the user. At some point in time a request is made for an e-mail to be sent to the user by providing an e-mail address, an image tag and the identifier to an e-mail provider. The image tag and the identifier are embedded into the e-mail and the e-mail is sent to the user. The e-mail is opened and the user's e-mail client requests the image content based on the image tag from the recommendation platform and sends the anonymous ID to the recommendation platform as part of the image URL. The user ID is looked up in the recommendation platform database and the associated behavioral data is used to generate content for the e-mail and this content is then displayed in the e-mail as an image. When the image is engaged with, a request is sent to the recommendation platform that references the user identifier and a logical location in the image where the click occurred, the image location is looked up along with the user identifier to present the correct page or content for the user.

In another embodiment a rendering client is in communication with an image render engine, the image render engine is configured for receiving at least one image request from the rendering client and generating at least one result request based upon the image request. A result generator is configured for generating results based upon the result request and sending the results to the rendering client and a cache. An image map having image locations linked to URLs, the image locations are called upon in response to a click request and the click request having a logical identifier that corresponds to the information sent in the result request has a logical slot identifier that uniquely identifies the information engaged with by the rendering client.

BRIEF DESCRIPTION OF THE DRAWINGS

The inventive body of work will be readily understood by referring to the following detailed description in conjunction with the accompanying drawings, in which.

DETAILED DESCRIPTION

A dynamic generation of correlation scores between arbitrary objects is disclosed. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Embodiments of the invention may include various processes as set forth below. The processes may be embodied in machine-executable instructions. The instructions can be used to cause a general-purpose or special-purpose processor to perform certain steps. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Figure 1:
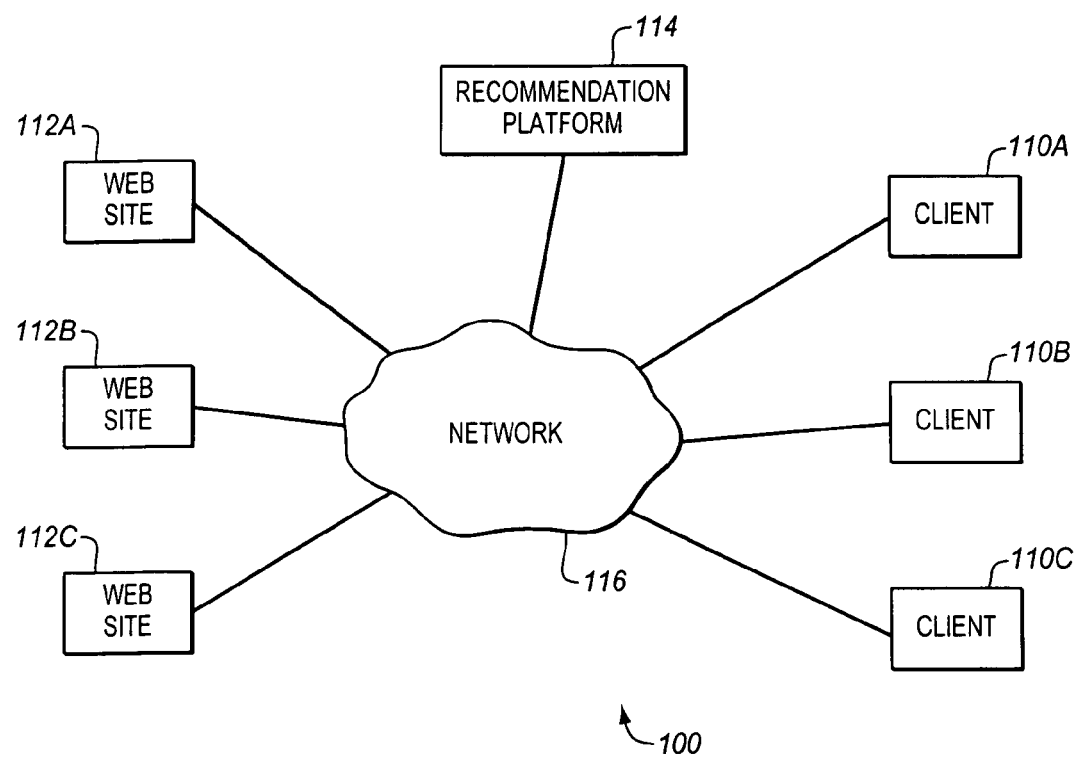
FIG. 1 is a high-level block diagram of a computing environment according to one embodiment of the present invention.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A," "110B," and/or "110C" in the figures).

FIG. 1 is a high-level block diagram of a computing environment 100 according to one embodiment of the present invention. FIG. 1 illustrates three client computers 110A, 110B, 110C, three web sites 112A, 112B, 112C, and a recommendation platform 114 connected by a network 116. At the highest level, end-users of the clients 110 interact with the web sites 112 to establish relationships. The web sites 112 and/or the clients 110 themselves provide information (view data, click data, buy data) to the recommendation platform 114. The recommendation platform 114 uses an assortment collaborative filtering and/or other techniques to process the data to generate recommendations (the term recommendations includes any type of content or information that has been established by the recommendation platform 114) that are presented to end-users.

The client 110 in this embodiment represents a computer that is used by an end-user to interact with the web sites 112 and/or recommendation platform 114 via the network 116. The client 110 can be, for example, a personal computer or another network-capable device, such as a personal digital assistant (PDA), a cellular telephone, a pager, a video game system, a television "set-top box" etc. Although FIG. 1 illustrates only three clients 110, embodiments of the present invention can have thousands or millions of clients participating in the environment 100 described herein. Three clients 110 are illustrated in order to simplify and clarify the present description.

The web sites 112 are locations on the network 116 that provide web pages to the clients 110 via the network 116. The web sites 112 can be, for example, media sites that primarily provide content such as news to the end-users, retailer sites that enable the end-users to purchase items, social networking sites that enable end-users to interact with other people, and hybrid sites that provide a mix of these features. Those of skill in the art will recognize that there are essentially an unlimited number of different types of web sites 112 with which the clients 110 can interact. Although FIG. 1 illustrates only three web sites 112, embodiments of the present invention can have many web sites. Only three websites 112 are illustrated in order to simplify and clarify the present description. The web sites 112 need not be related or associated with each other.

The end-users of the clients 110 interact with the web sites 112 to establish relationships. For example, assume an end-user views a web page for a digital camera, and then views a web page for a memory card for that camera. These actions create relationships between the end-user and the camera, and between the end-user and the memory card as well as the memory card and the camera. The web sites 112 observe relationships such as these, and provide messages to the recommendation platform 114 describing them. When a list of correlated objects is requested (a recommendation request) based upon an external request for recommended content, a seed item is generated, such as a person or an item that is being viewed, to generate the recommendations.

In addition, the web sites 112 receive recommendations from the recommendation platform 114. These recommendations are provided to the end-users, typically by including the recommendations on web pages served to the end-users' clients 110. The recommendations can be for arbitrary and/or heterogeneous items and the web sites can request that the recommendation platform 114 provide recommendations for only specified types of items. In addition, "offline" information can be used in combination with the online data to possibly enhance the relevance of information to be served to the user in the form of recommendations. For example, the recommendations can include items an end-user might want to purchase, news stories the end-user might want to read, bands the end-user might like, discussion groups in which the end-user might want to participate, etc.

The network 116 represents the communication pathways between the clients 110, web sites 112, and recommendation platform 114. In one embodiment, the network 116 is the Internet. The network 116 can also utilize dedicated or private communications links that are not necessarily part of the Internet. In one embodiment, the network 116 uses standard communications technologies and/or protocols. Thus, the network 116 can include links using technologies such as 802.11, integrated services digital network (ISDN), digital subscriber line (DSL), asynchronous transfer mode (ATM), etc.

Similarly, the networking protocols used on the network 116 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 116 can be represented using technologies and/or formats including the hypertext markup language (HTML), the extensible markup language (XML), the web services description language (WSDL), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
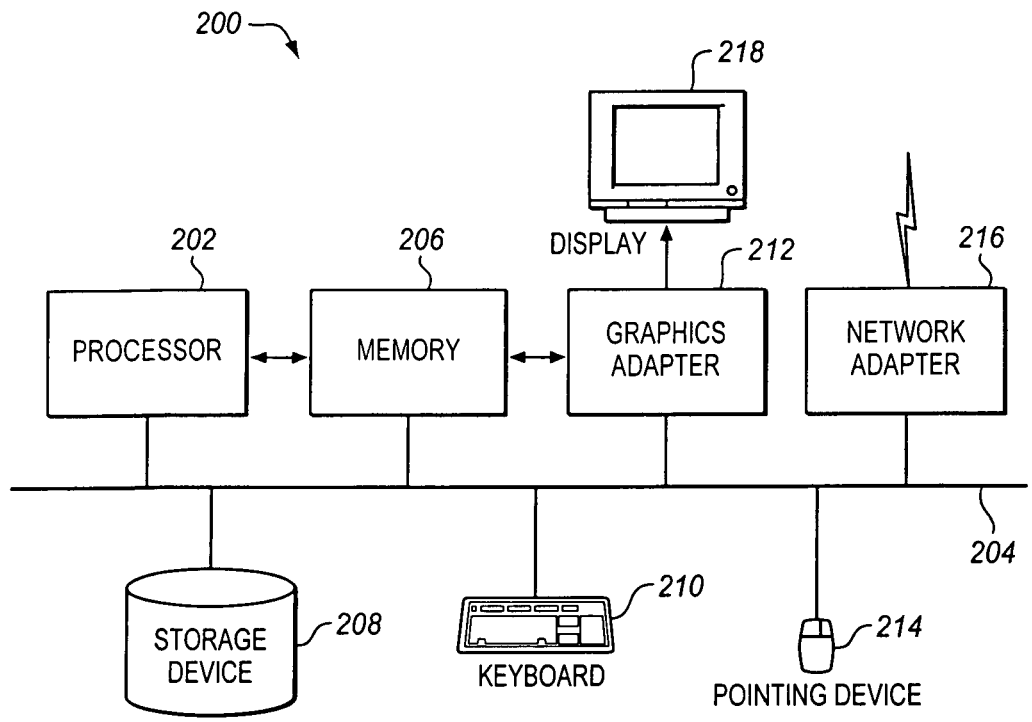
FIG. 2 is a high level block diagram illustrating one embodiment of the present invention.

FIG. 2 is a high-level block diagram illustrating a functional view of a typical computer 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 310, a graphics adapter 312, a pointing device 214, and a network adapter 216. A display 218 is coupled to the graphics adapter 312.

The processor 202 may be any general-purpose processor such as an INTEL x86, SUN MICROSYSTEMS SPARC, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 310 to input data into the computer system 200. The graphics adapter 312 displays images and other information on the display 218. The network adapter 216 couples the computer system 200 to the network 108.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power required for the entity. For example, the client 110 typically requires less processing power than the web site 112 and recommendation platform 114. Thus, the client 110 can be a personal computer, cellular telephone, etc. The web site 112 and recommendation platform 114 computers, in contrast, may comprise more powerful processors and/or multiple computers working together to provide the functionality described herein. In addition, the computers 200 can lack some of the features shown in FIG. 2. For example, a blade server supporting a web site 112 may lack a keyboard, pointing device, and display. In one embodiment, the computer 200 serving as the recommendation platform 114 utilizes a processor 202 and/or memory 206 having a 64-bit word size.

Figure 3:
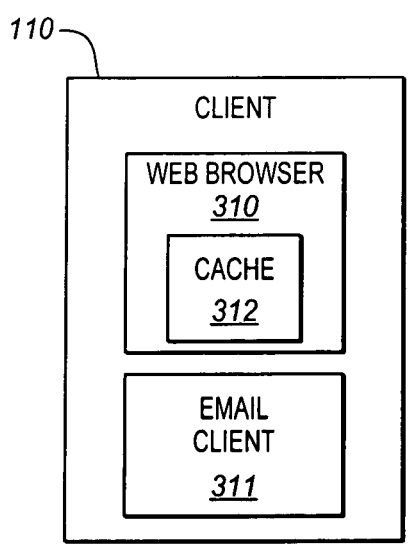
FIG. 3 shows a more detailed example of a system that could be used to practice embodiments of the inventive body of work.

FIG. 3 is a high level block diagram configuration of a client 110. As illustrated in FIG. 3 the client includes a web browser module 310 that allows the end-user to view web pages and/or other data provided by the web sites 112 and/or recommendation platform 114. In one embodiment the web browser 310 communicates with a web server by using HTTP (hypertext transfer protocol) to fetch web pages where the web pages are in HTML format.

In other embodiments other URL types and their corresponding protocols, such as gopher: for Gopher (a hierarchical hyperlinking protocol), ftp: for FTP (file transfer protocol), rtsp: for RTSP (real-time streaming protocol), and https: for HTTPS (an SSL encrypted version of HTTP) may be used.

In one embodiment, the browser module 310 is a conventional web browser, such as MICROSOFT INTERNET EXPLORER or MOZILLA FIREFOX. The browser module 310 maintains a cookie cache 312 that stores cookies received from web sites 112 on the network 116. A web site 112 can communicate with the browser 310 and instruct it to create a cookie in the cookie cache 312 holding certain information.

According to one embodiment, the browser 310 provides the cookie when the browser connects to the site that created it. In one embodiment the cookie information includes a user identifier. The user identifier can be in the form of a database primary key, an IP address, an e-mail address, a random identification, an anonymous identification or any other identifier capable of being associated with a user for the purpose of identifying the user.

In addition, the client 110 includes an e-mail client module 311 that communicates with an e-mail server and a recommendation platform. In one embodiment the SMTP protocol is used for the communication although one of ordinary skill in the art will recognize that other protocols may be used.

Figure 4:
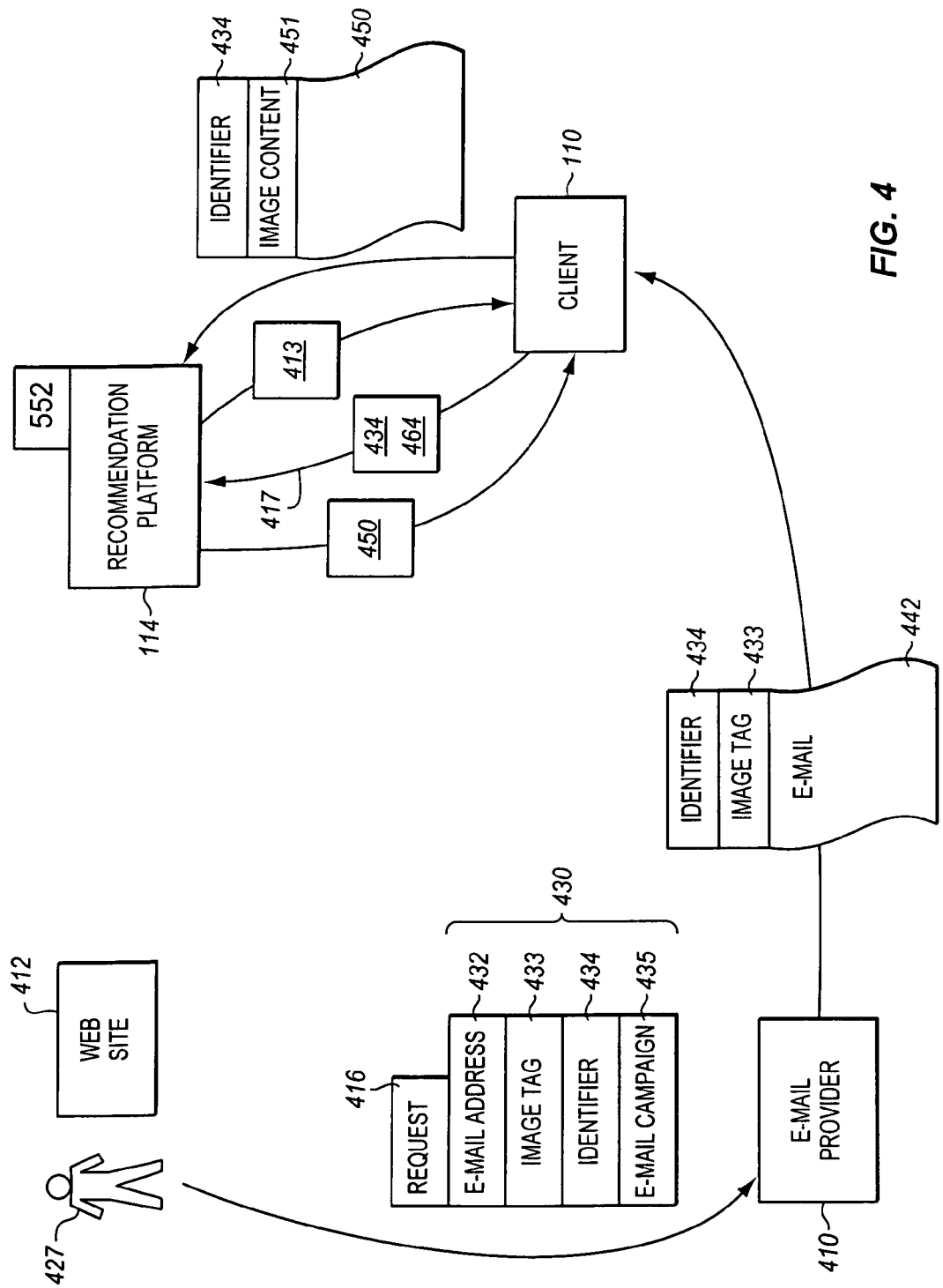
FIG. 4 is a high level block diagram illustrating a system according to one embodiment of the present invention.

FIG. 4 is a high level block diagram illustrating one embodiment of a system. A client 110 is engaged with a website 112 and behavioral data about the client is being collected and sent to the recommendation platform 114. The recommendation platform 114 associates the user's identification 415 with cookie data and behavioral data all of which is stored in the recommendation platform 114 database.

According to one embodiment, the user's identification 415 is anonymous. Additionally, platform 114 is configured for storing standard information about items the user has visited on website 112 associating certain items together and using certain items for recommendations.

An operator 427 of the website 112 initiates an e-mail campaign by sending a request 416 to an e-mail provider 410 to send an e-mail to the client 114. Without loss of generality, the e-mail provider 410 and operator 427 may be the same or different entities/organizations.

The request 416 may be made through any number of communication channels. In one embodiment, the request 416 is made for an e-mail to be sent to the user by providing additional information 430. For example, one or more of the following in varying combinations may be sent to the e-mail provider 410 as additional information 430: an e-mail address 432, an image tag 433, the identifier 434 and an e-mail campaign number 435 are sent to the e-mail provider 410.

Based upon the request 416 and any additional information 430 provided by the website operator 427, the e-mail provider 410 will prepare and send an e-mail 442 to the client 110. In one embodiment, the e-mail provider 410 embeds an image tag 433 and the identifier 434 into an e-mail 442. In other embodiments, additional or different information can be embedded into the e-mail depending on the desire of the website operator 427.

The e-mail 442 is opened and the user's e-mail client 311 makes an e-mail client request 450. The e-mail client request 450 may contain any information. In one embodiment, image content 451 based on the image tag 433 is requested and the request further includes the identifier 434 that is sent to the recommendation platform 114 as part of an image URL.

The identifier 434 is looked up in the recommendation platform 114 database 552 as well any associated behavioral data to generate content for the e-mail to be sent to the client 114. In one embodiment, behavioral data is stored in the same database as the identifier 434. In another embodiment, behavioral data is stored in a separate database. The image content 451 is then displayed in the e-mail.

According to one embodiment, the image content is a graphical image. Without loss of generality, the graphical image can be any format supported by the e-mail client 310. In a further embodiment, the graphical image is a PNG or GIF image. When the image is engaged with, a second request 417 is sent to the recommendation platform 114 that references the user or request identifier 434 and a logical location 464 in the image where the user engaged with the image, the image location is looked up along with the user identifier to present the correct page wherein the correct content is sent 418 to the client 114.

Figure 5:
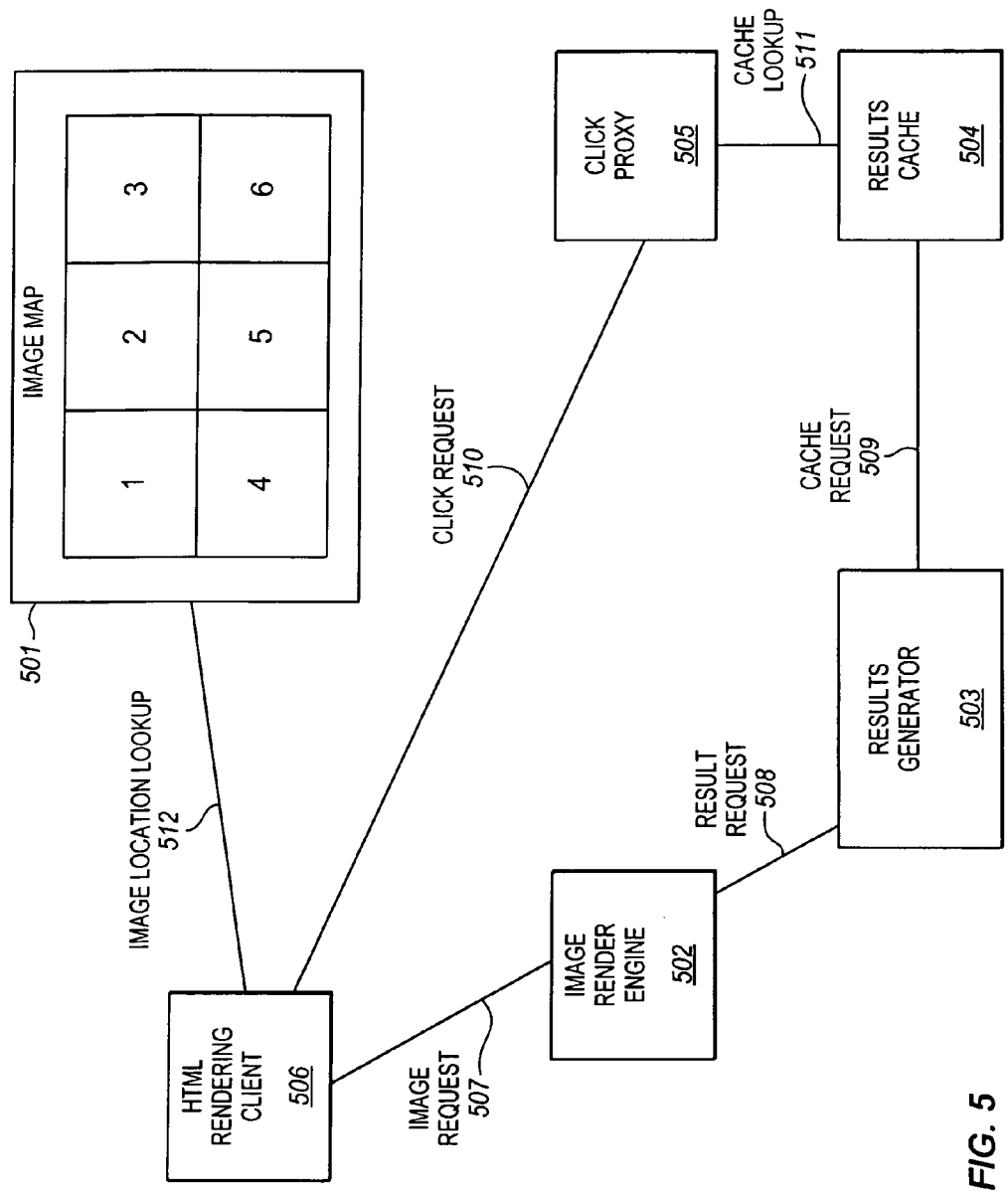
FIG. 5 is a high level block diagram illustrating a system according to one embodiment of the present invention.

FIG. 5 is a high level block diagram illustrating another embodiment for generating dynamic content generation in e-mails. An HTML rendering client 506 makes an image request 507 to the image render engine 502. In one embodiment, the HTML rendering client 506 is an e-mail client such as Microsoft Outlook. In other embodiments, the HTML rendering client 506 can be any software that is capable of displaying an image or alternative text and directing clicks on locations in an image to different URLs as would be understood by one of ordinary skill in the art.

The image request 507 includes the logical data describing the request for an image. In one embodiment, this includes the user's anonymous identity. In another embodiment, this request contains a summarized version of the user's purchase history as well as the user's anonymous identity. In yet another embodiment, this request contains a seed item or set of items for which relevant recommendations are required. A seed item being any type of object or item for which a recommendation should be generated. Without limiting the foregoing, the image request 507 can be a request for any information that describes properties of a request for multiple logical entities in a single image.

The image render engine 502 makes the result request 508 to the result generator 503. The result request 508 is a logical translation of the image request 507 to fetch results from the result generator 503. In one embodiment, the result request 508 contains a superset of the data in the image request 507. In another embodiment, the result request 508 contains a subset of the data in the image request 507. In other embodiments, the result request 508 can be any request for results from the result generator 503.

In response to the result request 508, the result generator 503 generates results to be returned to the user based upon the image request. In one embodiment, the result generator 503 generates output describing content items using recommendation algorithms, such as collaborative filtering or lexical techniques. Without loss of generality, the result generator 503 may be anything that generates one or more results to be returned to the user that can be interpreted by the image render engine 502. For example, in one embodiment the results may be a blend of pictures and links to articles. In other embodiments, only a single piece of content is displayed.

After the result generator 503 completes result generation, the results to be returned to the user are sent to the results cache 504 with a cache request 509. The cache request 509 contains the location or definition of the result entities generated by the result generator 503, along with a logical tag that corresponds to the location of the item embedded in the image defined in the image map 501.

In response to the cache request 509, the results cache 504 stores the data for later lookup by the Click Proxy 505. In one embodiment, the results cache 504 uses volatile storage to temporarily store the results for a fixed time interval. In another embodiment, the results cache 504 uses a permanent storage medium like disk to store results indefinitely. In another embodiment, the results cache 504 can store the logical contents of the cache request 509 via any digital medium for any period of time.

After completing the cache request 509, the result generator 503 returns the response to the result request 508 to the image render engine 502. In one embodiment, the results are returned in sorted order that corresponds to the data embedded in the image map 501. In another embodiment, the data is returned with a logical ordering tag that defines the order in which the results should be displayed.

The image render engine 502 uses the response from the results request 508 to render an image that represents the logical data returned from the result generator 503. In one embodiment, the image render engine 502 is a web browser that captures rendered screen contents as an image. Without loss of generality, the image render engine 502 can be any device that is configured for rendering the response of the result generator 503 into an image with fixed locations that match the contents of the image map 501.

After rendering, the image render engine 502 sends the response to the image request 507 to the HTML rendering client 506. In a preferred embodiment, this response is a PNG format image representing rendered HTML results. In another embodiment, the response can be any image that is configured to be displayed in the HTML rendering client 506. The returned images in a preferred embodiment also include alternative text and other parameters to render in cases where the e-mail is not read in an HTML client or where images are blocked.

In response to user interaction, the HTML rendering client 506 performs an image location lookup 512 request to the image map 501. In one embodiment, the image map 501 is an HTML image map with predefined image locations linked to URLs that send the user to the Click Proxy 505. Without loss of generality, the image map 501 can be any technology, such as a MACROMEDIA FLASH interface, that is configured for mapping specific locations in an image to predefined URLs.

As a result of the image location lookup 512, the HTML rendering client 506 will have obtained a URL reference that is sent as a recommendation request 570. The recommendation request 510 contains a logical identifier that corresponds to the information sent in the result request 508, along with a logical slot identifier that uniquely identifies the item the user clicked.

The above described mechanism provides accurate content for recipients by enabling senders to dynamically and automatically update the contents of their e-mails after they are sent up until the time they are opened.

Although the foregoing has been described in some detail for purposes of clarity, it will be apparent that certain changes and modifications may be made within the scope of the appended claims. It should be noted that there are many alternative ways of implementing both the processes and apparatuses described herein. Accordingly, the present embodiments are to be considered as illustrative and not restrictive, and the inventive body of work is not to be limited to the details given herein, but may be modified within the scope and equivalents of the appended claims.

What is claimed is:

1. A method comprising:
   a client computer accessing data from a web server;
   the web server transmitting behavioral data for the client computer to a recommendation platform based upon the data accessed by the client computer;
   the web server transmitting an electronic mail (e-mail) message to the client computer, wherein the e-mail includes an image tag and an identifier;
   the client computer requesting image content from the recommendation platform based on the client computer selecting the image tag and transmitting the identifier to the recommendation platform;
   the recommendation platform generating at least one recommendation for the client based on the behavioral data; and
   the recommendation platform transmitting the at least one recommendation to the client computer.

2. The method of claim 1 further comprising transmitting the recommendation to the client computer wherein an image is displayed to the user in the e-mail.

3. The method of claim 2 wherein the image content request includes a seed item.

4. The method of claim 1 further comprising:
the recommendation platform associating the image content request with a customer identifier; and
the recommendation platform recording behavioral data generated from Web page requests from the client to the web server using the customer identifier.

5. The method of claim 4 further comprising:
the client computer opening the e-mail message; and
the client computer transmitting the request for the image content with the image tag to the recommendation platform as part of an image URL.

6. The method of claim 5 further comprising the recommendation platform searching a database for associated behavioral data using the customer identifier in response to receiving the request from the client computer.

7. The method of claim 1 wherein the web server transmitting the e-mail message to the client computer comprises:
the web server initiating an e-mail request to an e-mail provider; and
the e-mail provider transmitting the e-mail message to the client computer.

8. The method of claim 7 wherein the request to the e-mail provider includes an e-mail address, e-mail information and the image tag.

9. The method of claim 8 wherein the e-mail message includes an image request URL and the image tag.

10. A method comprising:
a recommendation platform collecting user behavior data from a web server, the user behavioral data based upon a browsing history of a user at a web client;
the web server transmitting an e-mail message to the web client, wherein the e-mail message includes an embedded image tag and an identifier;
the web client requesting image content from the recommendation platform by transmitting the identifier to the recommendation platform upon the user selecting the embedded image tag within the e-mail message;
the recommendation platform searching a database for associated behavioral data;
generating at least one recommendation based on the behavioral data; and
transmitting the at least one recommendation to the web client.

11. The method of claim 10 wherein transmitting the e-mail message to the user comprises:
initiating an e-mail request to an e-mail provider; and
the e-mail provider transmitting the e-mail message to the client.

12. The method of claim 11 wherein the request to the e-mail provider includes an e-mail address, e-mail information and a customer seed item.

13. The method of claim 12 wherein the e-mail message includes an image request URL.

14. A system comprising:
a client computer;
a web server accessed by the client computer to transmit an electronic mail (e-mail) message including an image tag and an identifier to the client computer; and
a recommendation platform to receive behavioral data for the client computer from the web server, to receive an image content request which includes the identifier from the client computer in response to the client computer receiving the e-mail massage and selecting the image tag, to generate at least one recommendation for the client computer based on behavioral data associated with the image tag, and to transmit the at least one recommendation to the client computer.

15. The system of claim 14 wherein the recommendation platform associates the image tag with a customer identifier and records behavioral data generated by the page requests from the client computer to the web server using the customer identifier.

16. The system of claim 15 wherein the client computer comprises an e-mail client to open the e-mail message and transmit the request for the image content with image tag to the recommendation platform as part of an image URL.

17. The system of claim 16 wherein the recommendation platform comprises a database that is searched for associated behavioral data using the customer identifier in response to receiving the request from the client.

18. The system of claim 14 further comprising an e-mail provider to receive the e-mail request from the web server and to transmit the e-mail message to the client computer.

19. The method of claim 18 wherein the request to the e-mail provider includes an e-mail address, e-mail information and the image tag.

20. The method of claim 19 wherein the e-mail message includes an image request URL and image tag.

* * * * *